UNITED STATES PATENT OFFICE.

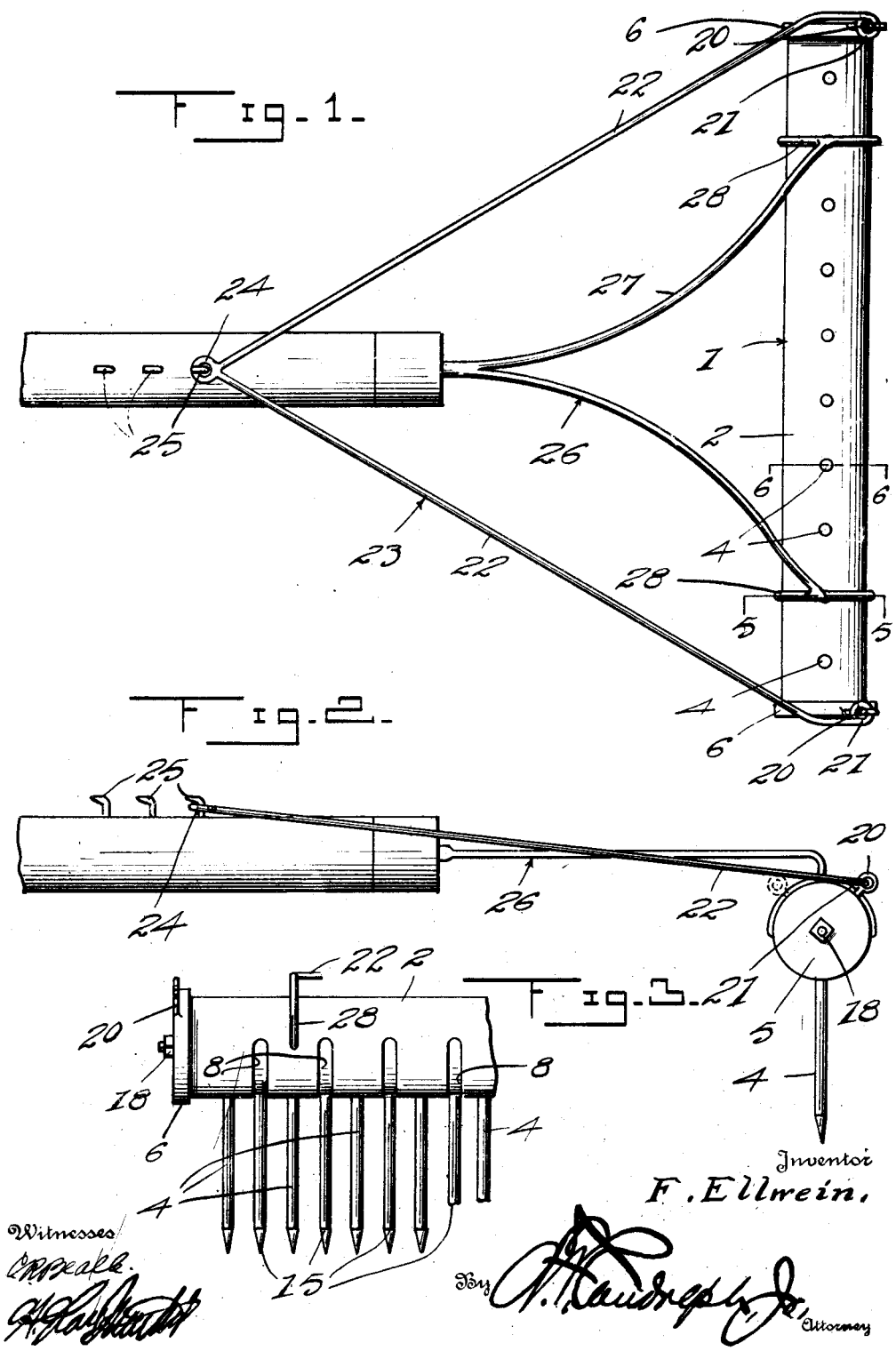

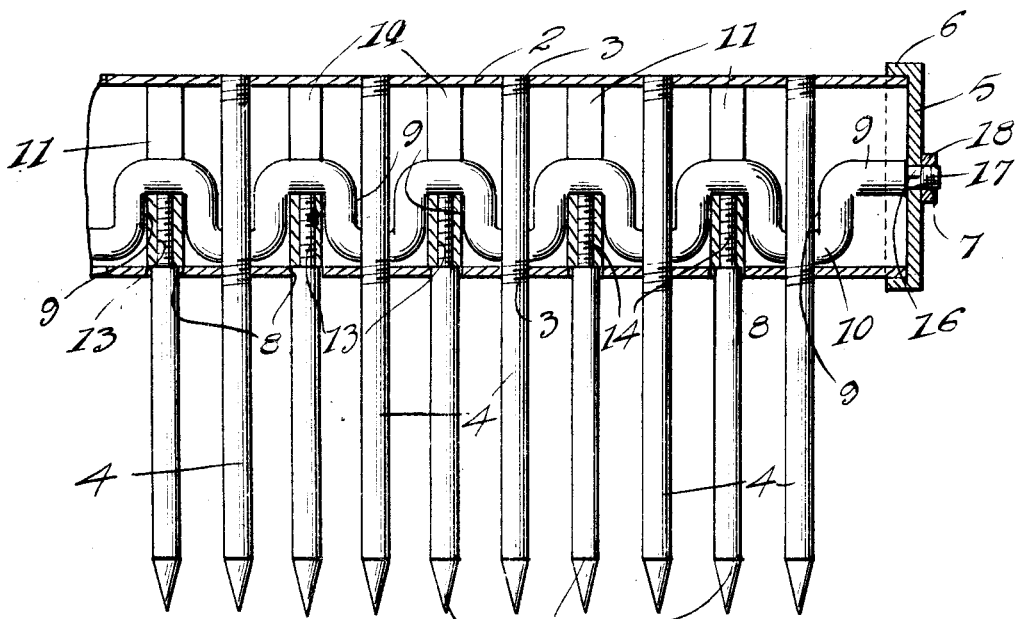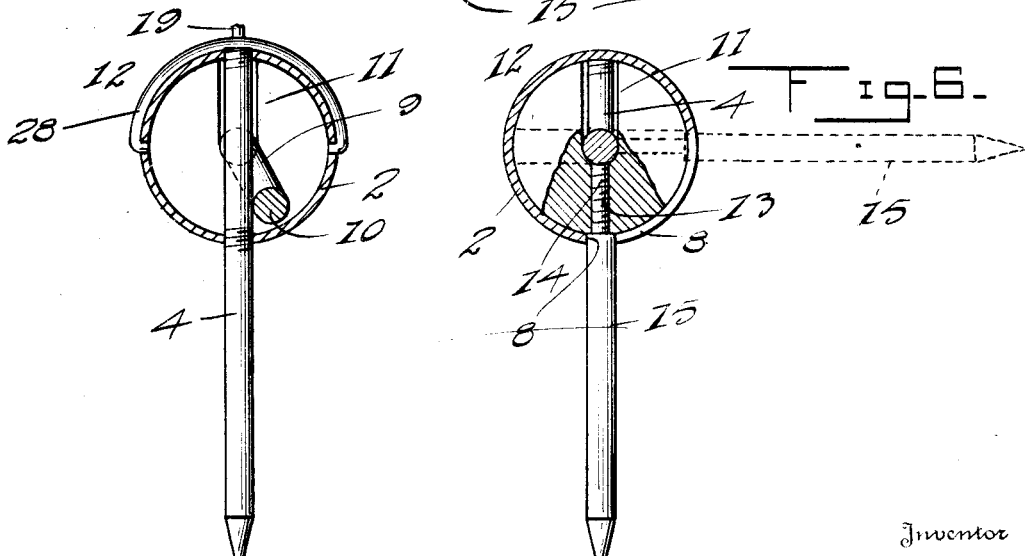

FREDERICK ELLWEIN, OF HAZEN, NORTH DAKOTA.

RAKE.

1,182,153.

Specification of Letters Patent. Patented May 9, 1916.

Application filed April 30, 1915. Serial No. 25,021.

*To all whom it may concern:*

Be it known that I, FREDERICK ELLWEIN, a citizen of the United States, residing at Hazen, in the county of Mercer and State of North Dakota, have invented certain new and useful Improvements in Rakes; and I do hereby declare the following to be a full, clear, and exact description of the invention, such as will enable others skilled in the art to which it appertains to make and use the same.

This invention relates to new and useful improvements in rakes, and has for its principal object to provide a rake in which it is possible to adjust the teeth so that the spaces therebetween may be made wider or more narrow to suit the desires of the user.

Another object of the invention is to provide a rake which is capable of being used to rake grass and the like, and which when so desired, may be so arranged that it will straddle plants without injuring them.

A further object of the invention is to provide a rake having two sets of teeth which are so arranged that one set may be thrown into an inoperative position or into an operative position according to the character of work to be done.

Still another object of the invention is to provide a novel means for supporting the rake teeth on the rake head in such a way that one set may be thrown into and out of operation.

With these and other objects in view, the invention consists in the novel combination and arrangement of parts which will be fully set forth in the following specification and accompanying drawings, in which, Figure 1 is a top plan view of a rake head constructed in accordance with this invention, Fig. 2 is a side view in elevation of Fig. 1, Fig. 3 is a fragmentary front end elevation of the rake head, Fig. 4 is a longitudinal sectional view through a portion of the rake head, Fig. 5 is a sectional view on line 5—5 of Fig. 1, and, Fig. 6 is an enlarged sectional view on line 6—6 of Fig. 1.

Referring to the drawings by characters of reference, the numeral 1 designates as an entirety the rake head, which comprises the tubular body 2. This tubular body is formed with diametrically opposed, spaced apertures 3 which are preferably internally screw threaded and are arranged to receive the upper ends of the stationary rake teeth 4. The lower ends of these teeth are ta- pered in the usual way to form points, and the ends of the tube 2 are closed by suitable caps 5 which are provided with the flanges 6, which surround the ends of the tube and hold the caps rotatably in place. Suitable central rectangular apertures 7 are formed centrally of the caps and are for the reception of the ends of the shaft on which the movable rake teeth are mounted. Formed intermediate the apertures 3 in one side of the tubular body 2 and in longitudinal alinement with the apertures, are the slots 8 which extend substantially one-fourth of the distance around the body. These slots receive the movable rake teeth as clearly illustrated in the drawings.

The supporting shaft for the movable rake teeth is designated by the numeral 9, and this shaft is formed with a plurality of cranks 10 and have rigidly mounted thereon the disks 11 which are concentric with the tubular casing 2, and are of a diameter sufficient to fit the interior thereof. Each of these disks is formed with a central aperture 12 for the reception of the shaft 9 and communicating with the central aperture and extending to the periphery of each of the disks is a radial bore 13 which is preferably internally screw threaded to receive the reduced threaded extension 14 formed on each of the movable rake teeth 15. The ends of the shaft 9 are formed with the reduced rectangular extensions 16, which in turn are formed with the reduced, cylindrical threaded extensions 17 upon which the nuts 18 are threaded. The rectangular extensions 16 are arranged to fit the apertures 7 in the cap 5, and it will thus be seen that the shaft and cap will rotate simultaneously.

In order to provide a means whereby the caps and shaft, together with the rake teeth 15 may be rotated, each of the caps is formed with a suitable radial extension 19 which terminates at its upper end in a suitable eye 20. Extending through the eye and secured therein is a suitable loop 21, which is mounted at the end of each of the arms 22 of the V-shaped operating member designated generally by the numeral 23. This V-shaped operating member is formed at its apex with a suitable eye 24 which is arranged to surround any one of the hooks 25 which is mounted in the rake handle.

In order that the rake head may be supported in proper position with relation to the rake handle, the V-shaped bracket, designated generally by the numeral 26, is provided, and each of the arms 27 is formed at its outer end with the arcuate depending portion 28 which is of a radius sufficient to fit the curvature of the rake head 1. The apex of the V-shaped supporting member 26 extends into an aperture formed in the rake handle, and it will thus be seen that the rake head is rigidly supported with relation to the handle.

It will be apparent from the foregoing that in use when it is desired to use the rake in the ordinary way, the auxiliary teeth 15 are thrown downwardly into the position illustrated in Figs. 3 and 4, so that the teeth are spaced relatively close. Should it be desirable to use the rake in a manner similar to a cultivator, the auxiliary teeth are thrown into the position illustrated in the dotted lines in Fig. 6 by pulling the V-shaped operating frame 23 until it reaches the hook 25 farthest from the lower end of the handle. In this way it will be seen that the teeth will be thrown upwardly so that a relatively wide space is left between the rake teeth 4 so that they will straddle a plant without injuring the same in any way.

While in the foregoing there has been shown and described the preferred embodiment of this invention, it is to be understood that such changes may be made in the combination and arrangement of parts as will fall within the spirit and scope of the invention as claimed.

What is claimed is:

1. A rake of the character described including a hollow cylindrical head, stationary rake teeth carried by the head, a shaft extending through the head, disks rigidly mounted on said shaft and movable rake teeth carried by the disks and extending through slots in the head, means at the ends of the shaft to rotate the same, and means connected with the shaft rotating means to control the movement thereof and thereby throw the movable rake teeth into operative and inoperative positions.

2. A device of the character described including a tubular head, a shaft rotatable in the tubular head, said shaft being provided with a plurality of cranks, disks, rigidly secured to said shaft intermediate the cranks, the rake head being formed with transverse slots, movable rake teeth secured in the disks, and extending through the slots, caps at the ends of the rake head, extensions on the caps, and means connected to the extensions to rotate the caps and thereby rotate the shaft, thus causing the movable rake teeth to be swung into operative and inoperative positions.

3. A rake of the character described including a cylindrical head, provided with a plurality of spaced slots, stationary teeth carried by the head, a crank shaft extending through the head, disks rigidly secured at spaced distances apart on the crank shaft, teeth carried by the disks and extending through the slots in the head, means at the end of the shaft to rotate the same, means connected with the shaft rotating means to control the movement thereof, and thereby throw the movable rake teeth into operative or inoperative position.

In testimony whereof I affix my signature in presence of two witnesses.

FREDERICK ELLWEIN.

Witnesses:
  JACOB FR. RIEDEL,
  JOHN DREWELOW.